C. PINEGAR.
HORSESHOEING STOOL.
APPLICATION FILED OCT. 5, 1907.

1,270,204.

Patented June 18, 1918.

Inventor
Clifton Pinegar,

By
E. Hume Talbert
Attorney

UNITED STATES PATENT OFFICE.

CLIFTON PINEGAR, OF STEPROCK, ARKANSAS.

HORSESHOEING-STOOL.

1,270,204.   Specification of Letters Patent.   Patented June 18, 1918.

Application filed October 5, 1917. Serial No. 194,900.

*To all whom it may concern:*

Be it known that I, CLIFTON PINEGAR, a citizen of the United States, residing at Steprock, in the county of White and State of Arkansas, have invented new and useful Improvements in Horseshoeing-Stools, of which the following is a specification.

This invention comprehends generally improvements in farriery and more particularly has reference to a horseshoeing stool.

It is the principal object of this invention to provide a device of the above character designed for removably supporting and holding the hoof of a horse or other animal in a lifted position, thus enabling the blacksmith to conveniently attach a shoe to the hoof of the animal.

More particularly this invention embraces the provision of a horseshoeing stool wherein the hoof-clamping members are mounted so as to support the hoof of a horse therebetween, yet they are capable of releasing the hoof should the animal lose its balance, thus preventing injury to the animal.

As a further improvement this invention includes the provision of a device of the above-mentioned character wherein the clamping members are designed to be vertically adjusted with respect to the supporting standard.

Among the other aims and objects may be recited the provision of a device of the above character with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Similar characters of reference are employed in all of the above described views to indicate corresponding parts.

Figure 5:
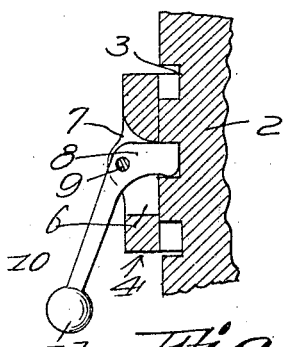
Fig. 5 is a sectional view much enlarged of the means for holding the frame in an adjusted position.
Figure 6:
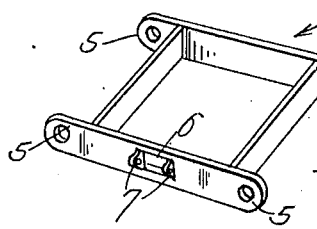
Fig. 6 is a perspective detail of the frame.

Referring now, more particularly, to the accompanying drawings, there is provided a base indicated in its entirety by the numeral 1 preferably constructed in a cross-like form, while extending perpendicularly therefrom is a supporting standard 2. This standard is preferably rectangular in cross-section, and is provided on one face adjacent its upper end with a vertical series of transversely extending teeth 3. Slidably and adjustably mounted on the upper end of the standard is a substantially rectangular frame indicated in its entirety by the numeral 4. Opposed ears 5 project from opposite sides of the frame and are preferably continuations of the front and rear portions as indicated in Fig. 6. The front portion of the frame is provided with an opening 6 preferably formed between the opposed ears 7 which are arranged at the ends of the opening and are struck outwardly from the front portion. A dog 8 is pivotally mounted between the ears 7 through the instrumentality of a pintle 9, while a handle 10 extends from the outer end of the dog and terminates in a weight 11 at the lower or outer end and designed to assure the engagement of the inner end of the dog with any one of the teeth 3 on the standard, as indicated in Fig. 5. This dog and handle in effect provide a bell-crank lever which is pivoted at its point of distortion.

Figure 1:
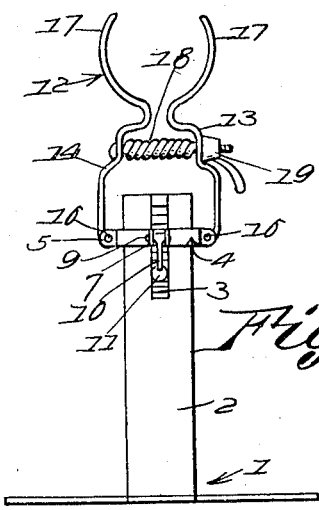
Figure 1 is a front elevation of the device.
Figure 2:
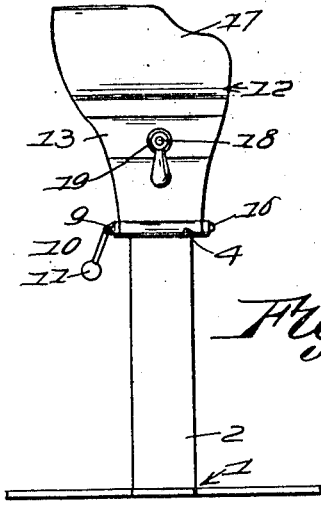
Fig. 2 is a side elevation thereof.
Figure 3:
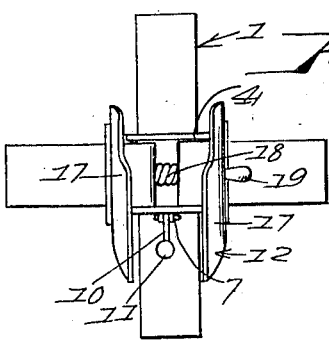
Fig. 3 is a top plan view of the invention.
Figure 4:
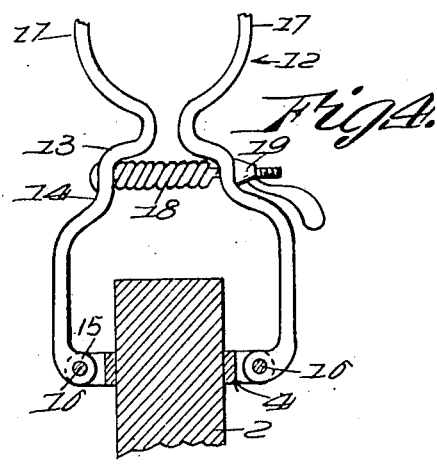
Fig. 4 is a sectional detail of the clamping members.

With a view toward providing the improved hoof receiving and clamping means, a pair of complemental hoof clamping members indicated in their entireties by the numeral 12 are provided, each member in the present instance consisting of a body portion 13 offset intermediate its ends as at 14. Spaced ears 15 are formed on the lower end of each body portion and extend inwardly, being pivotally engaged with the ears 5 through the instrumentality of suitable pivots 16. Arcuate clamping jaws 17 are formed on the upper end of the members and when the members are pivoted upon opposite sides of the frame these jaws are arranged in opposed relation with each other as indicated in Fig. 4.

Suitable means have been employed for normally and yieldingly holding the clamping members in close relation with respect to each other against the hoof of an animal when placed therebetween; and in reducing this feature of the invention to practice, a coil spring has one end extended through the opening in one of the offset portions 14 and rigidly connected thereto while its opposite end is threaded and slidably arranged through the opening in the other offset portion 14 and engaged by a handle-nut 19. The handle-nut of course coöperates with the offset portions for regulating the tension of the spring and for normally and yieldingly holding the jaws in engagement with the opposite sides of the hoof of an animal subsequent to placing the hoof of the animal between the jaws. If the animal should lose its balance the consequent force exerted on the jaws by the hoof will be sufficient to spread the jaws and release the hoof thus preventing injury to the animal.

In use, assuming that the parts have been assembled in the manner described and as indicated in the drawings, to properly adjust the clamping members on the standard, the dog 8 and its handle are swung to a position to permit of the proper positioning of the frame on the standard, whereupon the dog is swung inwardly to engage the teeth 3 as indicated in full lines in Fig. 5, and thus hold the frame and consequently the clamping members in a vertical adjustable position with respect to the standard 1. The handle-nut is now employed to regulate the tension of the spring 18 which holds the jaws normally in close relation with respect to each other subsequent to the spreading of the jaws, and on arranging the hoof of an animal between the jaws 17 the spring will coöperate with the jaws and yieldingly hold the latter against the opposite sides of the hoof of the animal to support the hoof in the proper position and thus enable the blacksmith to conveniently shoe the animal.

It is believed in view of the foregoing description that a further detailed description of the operation of the invention is entirely unnecessary. Likewise it is thought that the advantages of the invention will be readily apparent.

As many changes could be made in the above construction and many apparently widely different embodiments of this invention could be made without departing from the scope thereof, it is intended that all matter contained in the above description or shown in the accompanying drawings shall be interpreted as illustrative and not in a limited sense. It is also to be understood that the language used in the following claims is intended to cover all the generic and specific features of the invention herein described, and all statements of the scope of the invention which as a matter of language might be said to fall therebetween.

Having thus fully described this invention, what is claimed as new and desired to be secured by Letters Patent is:—

1. A device of the character described including a base, a perpendicular standard thereon and provided adjacent its upper edge with a series of teeth, a frame slidably mounted on the standard, a dog pivotally mounted on the frame and engageable with any one of the teeth, a weighted handle for operating the dog, opposed hoof-clamping members pivotally mounted on opposite sides of the frame, a coil-spring having one end rigidly secured to one of the clamping members and the other end movable through the other clamping member, and means for adjustably regulating the tension of the spring.

2. A device of the character described including a base, a perpendicular standard carried thereby and provided with a series of teeth, a frame slidably mounted on the standard and having an opening in the front portion thereof, ears projecting from the outer surface of the front portion of the frame, a dog pivotally mounted between the ears and passing through the opening for engagement with any one of the teeth of the standard for holding the standard in a vertically adjusted position, a weighted handle carried with the dog for facilitating the operation thereof, a pair of complemental opposed clamping members pivotally mounted on the frame and each embodying a body portion having an arcuate clamping jaw on the upper end thereof, a coil-spring having one end secured to the body portion of one of the clamping members and the other end threaded and slidable through the body portion of the other clamping member, and a handle-nut adjustably engaged on the threaded end of the spring and bearing against the outer surface of the adjacent body portion for regulating the tension of the spring.

In testimony whereof I affix my signature.

CLIFTON PINEGAR.